United States Patent
Heifets et al.

(10) Patent No.: US 8,120,789 B2
(45) Date of Patent: Feb. 21, 2012

(54) METHOD AND SYSTEM FOR PROCESSING AN ELECTRONIC DOCUMENT USING STREAMING OPTIMIZATION VIA PROGRAMMATIC ANALYSIS OF XML USE

(75) Inventors: Abraham Heifets, North Grafton, MA (US); Joseph J. Kesselman, Arlington, MA (US); Eric David Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 11/933,501

(22) Filed: Nov. 1, 2007

(65) Prior Publication Data

US 2009/0116078 A1    May 7, 2009

(51) Int. Cl.
G06F 15/00 (2006.01)
G06F 3/12 (2006.01)
G06K 1/00 (2006.01)
H04N 1/00 (2006.01)

(52) U.S. Cl. .................................. 358/1.13; 358/1.6
(58) Field of Classification Search ............... 358/1.1, 358/1.13, 1.14, 1.15
See application file for complete search history.

(56) References Cited

U.S. PATENT DOCUMENTS

| 6,772,413 B2 | 8/2004 | Kuznetsov |
| 2005/0273772 A1 | 12/2005 | Matsakis et al. |
| 2008/0012738 A1* | 1/2008 | Seki et al. .................. 341/51 |

* cited by examiner

*Primary Examiner* — Douglas Tran
(74) *Attorney, Agent, or Firm* — Moore & Van Allen PLLC; Charles L. Moore

(57) ABSTRACT

A method for processing an electronic document may include performing a programmatic analysis to determine all required portions of an input document to produce an output document. The method may also include generating an executable transformer to produce the output document from the input document. The method may further include producing the output document by transforming any streamable parts of the input document directly to corresponding parts of the output document without extraneous intermediate buffering.

20 Claims, 7 Drawing Sheets

METHOD AND SYSTEM FOR PROCESSING AN ELECTRONIC DOCUMENT USING STREAMING OPTIMIZATION VIA PROGRAMMATIC ANALYSIS OF XML USE

BACKGROUND OF THE INVENTION

The present invention relates to optimizing processing of electronic documents, such as Extensible Markup Language (XML) documents or similar electronic documents, and more particularly to a method and system for processing an electronic document using streaming optimization via programmatic analysis.

The Extensible Markup Language (XML) has gained popularity as a standardized syntax for communications over networks such as the Internet, and is being used in a wide range of applications ranging from short machine-to-machine messages up to extensive databases and documents. One limiting factor in the use of XML and XML tooling is that naive or simple processing approaches break down or become less efficient as document size increases. Loading an entire document into an in-memory data model (equivalently, document model) for processing, while efficient for small documents, becomes more onerous as the model size increases, requiring much more memory capacity and processing time. None the less, many tasks have been driven to use such models, since they may involve random access to the document's contents and thus may need substantially the entire document to be available for immediate retrieval. Extensible Stylesheet Language Transformation (XSLT) stylesheet execution is one example of such a random-access task; the XSLT language may access any portion of the input document at any time during processing.

BRIEF SUMMARY OF THE INVENTION

In accordance with an embodiment of the present invention, a method for processing an electronic document may include performing a programmatic analysis to determine all required portions of an input document to produce an output document. The method may also include generating an executable transformer to produce the output document from the input document. The method may further include producing the output document by transforming any streamable parts of the input document directly to corresponding parts of the output document without extraneous intermediate buffering.

In accordance with another embodiment of the present invention, a system for processing a document may include a programmatic analyzer operable on a processor to determine all required portions of an input document to produce an output document. The system may also include a streamability analysis module to determine which nodes and contexts of an input document are streamable to produce the output document. The system may further include a buffer to build-up an optimized document model from any non-streamable parts of the input document.

In accordance with another embodiment of the present invention, a computer program product to process an electronic document may include a computer usable medium having computer usable program code embodied therein. The computer usable medium may include computer usable program code configured to perform a programmatic analysis to determine all required portions of an input document to produce an output document. The computer usable medium may also include computer usable program code configured to generate an executable transformer to produce the output document from the input document. The computer useable medium may also include computer usable program code configured to produce the output document by transforming any streamable parts of the input document directly to corresponding parts of the output document without extraneous intermediate buffering.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1A:
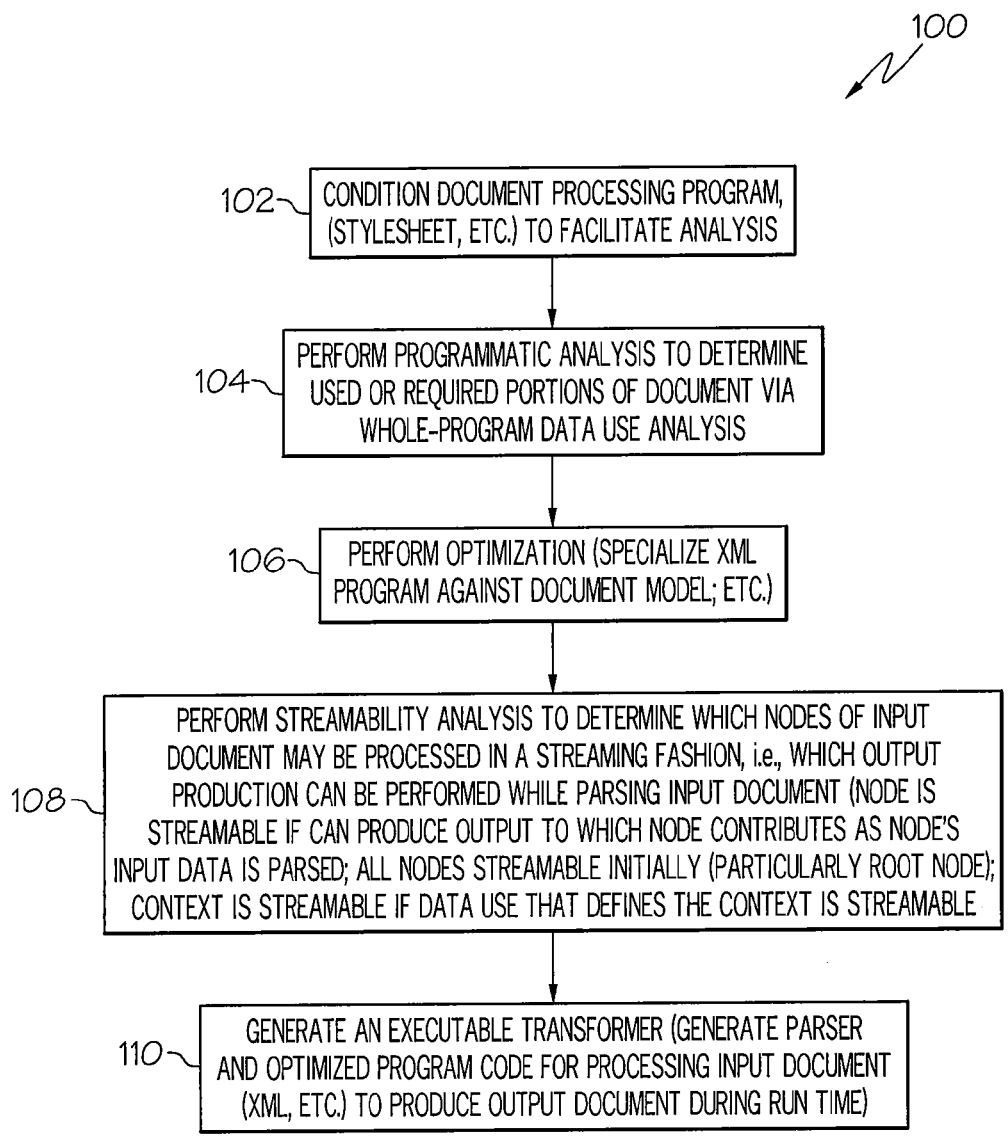
FIG. 1A is a flow chart of an exemplary method for transforming a document processing program during compilation including streaming optimization via programmatic analysis of XML use in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium, such as for example medium 638 in FIG. 6, having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, pigeon, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1A is a flow chart of an exemplary method 100 for transforming a document processing program during compilation including streaming optimization via programmatic analysis of XML use in accordance with an embodiment of the present invention. Examples of the electronic document may include forms or data associated with an e-commerce transaction or other data for some purpose that may be transmitted across a network, such as the Internet, private network or the like, between different computing or communications devices. While the present invention may be described with respect to an electronic document in XML, and Extensible Stylesheet Language Transformations (XSLT) for transforming XML documents into other forms or types of XML documents, the principles of the embodiments of the present invention described herein may be applicable to any stylesheets, templates, or other code, and to input document structures other than XML.

Figure 2:
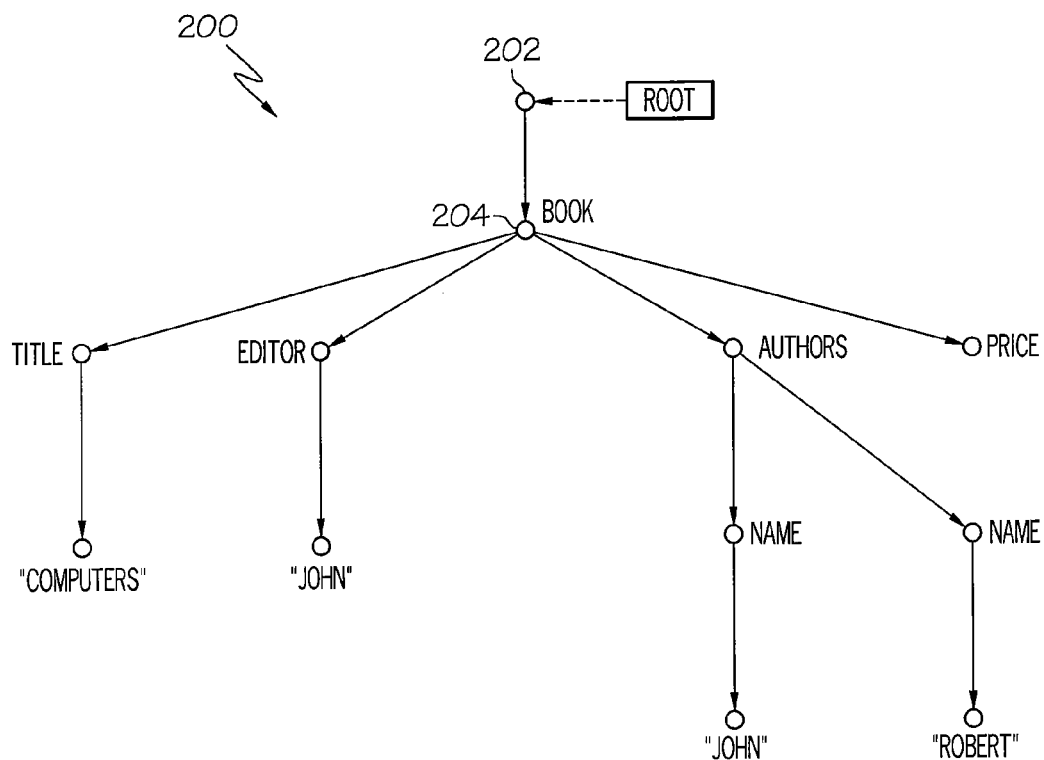
FIG. 2 is an example of a tree representing XML data in an XML document in accordance with an embodiment of the present invention.

For purposes of describing the present invention, an example of the form and structure of an XML document will be briefly described. Referring also to FIG. 2, FIG. 2 is an example of a tree 200 representing XML data. The XML data may define an XML document. The beginning or first node from which the tree 200 branches may be referred to as the root or root node 202. The tree 200 may then branch to other nodes 204. The XML data may also be represented as follows:

```
<book>
    <title>computers</title>
    <editor>john</editor>
    <authors>
    <name>john</name>
        <name>Robert</name>
    </authors>
    <price />
    <book>
```

Each node 204 may include data.

Contexts come from the process of executing the document processing program or XSLT program. Context may define a position of a node in the tree, such as what parent nodes are above a particular node in the tree. The context may change depending upon how a set or group of nodes may be defined. Consult the XSLT specification for precise definitions.

An XPath or XML Path Language is an expression language for addressing portions of an XML document, or for computing values, such as strings, numbers, Boolean values or the like based on the content of an XML document.

Referring back to FIG. 1A, in block or module 102, a document processing program may be conditioned, formed or modified to facilitate analysis. The document processing program may be an Extensible Stylesheet Language (XSL) stylesheet, an Extensible Query Language (XQuery) expression, or similar document processing program in an electronic or coded form. Examples of conditioning, forming and modifying may include: correctly applying any modes, template priorities, import precedence or the like; removing any reverse paths from the document processing program; converting any conditional expressions to a single canonical style of expression; converting implied actions to explicit actions; replacing any "Apply-Templates" expressions; and any other operations to simplify the document processing program for analysis. An example of a method for conditioning, forming or modifying the document processing program is described in U.S. patent application Ser. No. 11/745,028, filed May 7, 2007, entitled "Method and System for Effective Schema Generation via Programmatic Analysis," by Abraham Heifets et al., which is assigned to the same assignee as the present application and is incorporated herein by reference.

In block or module 104, programmatic analysis may be performed on the document processing program or stylesheet to determine all potentially used or required portions of the input document in carrying out a particular processing or transformation of the input document. The potentially used or required portions of the input document imply an "effective schema" or "use-based" schema. The programmatic analysis to determine required portions of the input document may involve a whole-program data use analysis. The programmatic analysis may include analyzing accesses by a stylesheet to the input document. The programmatic analysis may further include determining which nodes of the input document affect the behavior of the output program or optimized output program. An example of a method to perform programmatic analysis is also described in U.S. patent application Ser. No. 11/745,028.

In block or module 106, the document processing program may be optimized by specializing against a specific document model. An example of a specialization process is described in U.S. patent application Ser. No. 11/501,216, filed Aug. 7, 2006, entitled "Method and Apparatus for Input Specialization" by Dennis A. Quan et al., which is assigned to the same assignee as the present application and is incorporated herein in its entirety by reference.

Specializing a document processing program against a specific document model may involve simplifying the document processing program, thereby reducing the number of operations. For example a naive document model may represent the complete document and may include information, such as unused data members and/or attributes, that may not be used in a particular application. Operations associated with these unused data members and/or attributes may be removed. Additionally, any reverse path use may be removed from the document processing program, permitting the program structure to be unidirectionally linked in only a child node direction. To achieve this, ancestor references to data elements may be identified and stored for future references to ancestor or parent nodes. Other examples of optimizing the document processing program by simplifying or specializing against the document model are described in U.S. patent application Ser. No. 11/501,216.

In block 108, a streamability analysis may be performed to determine which nodes and contexts of the input document may be processed in a streaming fashion. Streaming may be defined as directly producing an output from the input without saving any intermediate data longer than necessary, thus reducing in-process memory requirements and improving execution speed. Determining which nodes may be processed this way may include determining whether output production can be performed or created directly while parsing the input document. In other words, a node may be stream-processable if the output based upon this node's contribution can be computed and written out as the node's input data is parsed. More specifically, determining which nodes and contexts of the input document can be stream-processed may include determining which portions of the optimized output program rely upon references or portions of the input document that are entirely local to a particular subtree of the input document. Deforestation and inlining code-reorganization may be used to move data for streamable portions or parts of the input document into a generated parser during compile time, as described below, to produce corresponding portions of the output document as the input document is parsed. Any nodes in an optimized document model which will never be referenced as nodes can be eliminated from the data model and discarded during parsing. A context which is suitable for stream-optimization and stream-processing may be referred to as a streaming context; one which is not suitable for this optimization may be referred to as a non-streaming context.

In our exemplary embodiment of a stream-optimization algorithm, all nodes, particularly the root node, are optimistically considered candidates for stream-processing until the optimizer discovers otherwise. A context may be streamable if the data reference that defines the context is streamable. An example of a method for performing a streamability analysis will be described in more detail with reference to FIG. 3. An example of a method for determining streamability of a current context will be described in more detail with reference to FIG. 4.

In block or module 110, an executable transformer may be generated to process the input document to produce the output document during run time as described in more detail with reference to FIG. 1B. Generating the executable transformer may include generating a parser and optimized program code for processing the input document. An example of a method for generating a parser is described in U.S. patent application Ser. No. 11/745,028.

Figure 1B:
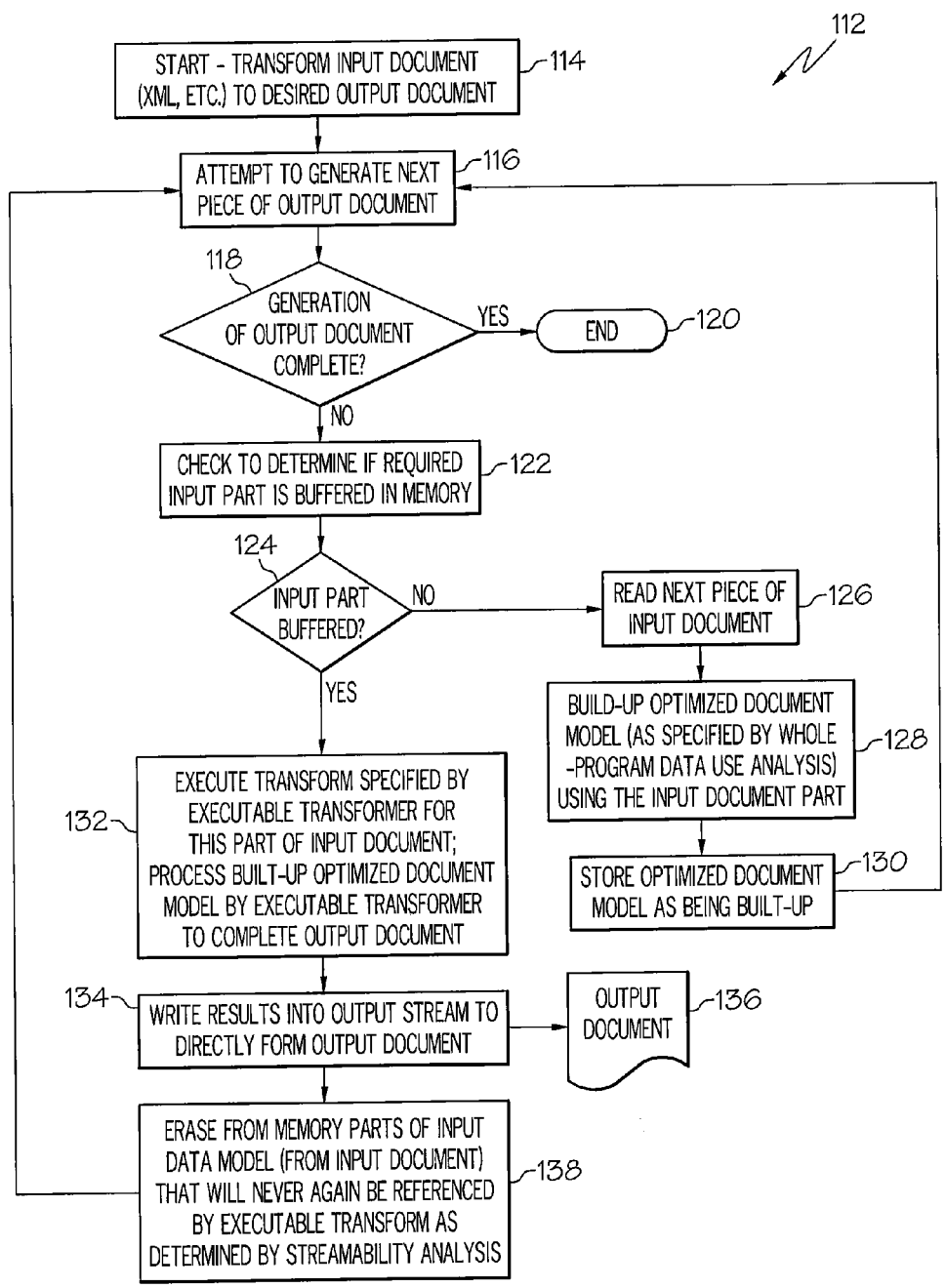
FIG. 1B is a flow chart of an exemplary method for processing an input document including streaming optimization in accordance with an embodiment of the present invention.

FIG. 1B is a flow chart of an exemplary method 112 for processing an input document including streaming optimization in accordance with an embodiment of the present invention. The functions or operations of the method 112 may be performed at run time to transform the input document or XML document, while the functions and operations of the method 100 of FIG. 1A may be performed by a compiler during compilation of the document processing program.

In block 114, the process to transform an input document such as an XML document or other input document to a desired output document may start. In block 116, an attempt may be begun to generate a first piece of the output document (if this is the first time through the process) or a next piece of the output document. This portion of the method may be thought of as a pull system. The output stream may request a next piece of output for an executable transformer, such as executable transformer 620 in FIG. 6. The transformer tries to generate the next piece of output which may succeed, yielding the next piece of output. If the transformer fails because more of the input is needed to generate the next piece of output, the next piece of input is read and the transformer tries to generate the output again or fails because the entire output has been generated as may be determined in block 118. In which case the method 112 may terminate at termination 120.

In block 118, a determination may be made of whether generation of the output document is complete. If so, the method 112 may end at termination 120. Otherwise, the method 112 may advance to block 122. In block 122, a check may be made to determine if the required part of the input document for the next piece of the output document has been buffered in memory. If the required input part has not been buffered in block 124, the method 112 may advance to block 126.

In block 126, the next piece of the input document may be read. In block 128, needed information from that piece may be added to an optimized document model, as specified by the whole-program data usage analysis in block 104 of FIG. 1A. In block 130, the optimized document model may be stored as it is being built-up from successive parts or pieces of the input document that have not yet been buffered. The method 112 may then return to block 116 and an attempt may be made to generate the next piece of the output document. The method 112 may then proceed as previously described.

Returning to block 124, if the required input part has been previously buffered in the optimized document model, the method 112 may advance to block 132. In block 132, a transform specified by the executable transformer may be executed for this part or piece of the input document. The stored, built-up optimized document model may be processed by the executable transformer to complete the output document 138. In block 134, the results of the transformation may be written into the output stream to form the piece of the output document 136 corresponding to the particular part of the input document.

In block 138, the part or parts from the input data model that will never be referenced further by the executable transformer (as determined by the streamability analysis in block 108) may be erased from memory to substantially (sometimes dramatically) reduce the amount of memory being used by the process. The method 112 may then return to block 116 to attempt to generate the next piece of the output document and the method 112 may proceed as previously discussed.

Figure 3:
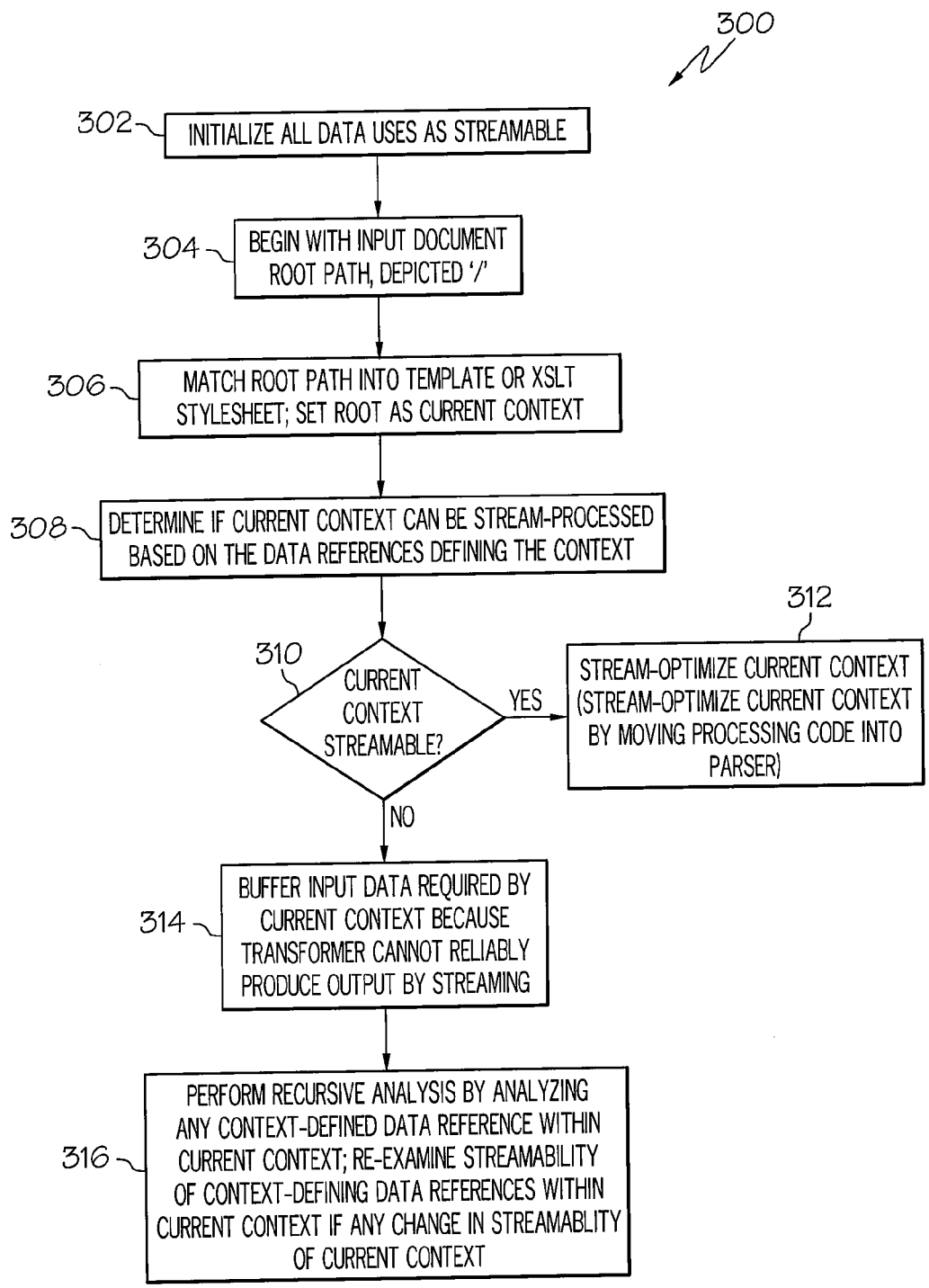
FIG. 3 is a flow chart of an example of a method for performing streamability analysis in accordance with an embodiment of the present invention.

FIG. 3 is a flow chart of an example of a method 300 for performing streamability analysis in accordance with an embodiment of the present invention. The method 300 may be used to perform the streamability analysis in block 108 of the method 100 in FIG. 1.

In block 302, all data references within a context may be initially (optimistically) assumed to be streamable. In block 304, the actual analysis may then begin with an input document root path that may be depicted by a slash, '/'. In block 306, the root path may be matched to a template or XSLT stylesheet template. The root path may be set as the current context.

In block 308, a determination may be made if the current context can be stream-processed based on the data references that define the context. An example of a method for determining the streamability of the current context will be described with reference to FIG. 4. If the current context is streamable in block 310, the current context may be streamed during parsing as previously described and the method 300 may advance to block 312. Here, the current context may be stream-optimized by moving the processing code into the parser. If the current context is not streamable in block 310, the method 300 may advance to block 314.

In block 314, the method 300 has determined that the current context is not reliably stream-optimizable, and also that the transformer would not be able to correctly produce any output for any constituent pieces of the current context by streaming. Accordingly, input data required by any data references defining the context must be buffered during processing, and the data references may be marked or otherwise identified as non-streamable.

In block 316, recursive analysis may be performed by analyzing any context-defined data reference within a current context. The streamability of context-defining data references within the current context must be re-examined if there is any change in the streamability of the current context, since when a node is marked as nonstreamable (and hence must be buffered) all its contents should be likewise marked. If a streamability status of a context is changed, then all of the inner/child/dependent/or similar context definitions need to be gone through and examined again. This situation arises when something is marked as "must-be-buffered" or a similar designation, it causes all contained pieces of the input document to be must-be-buffered also.

Figure 4:
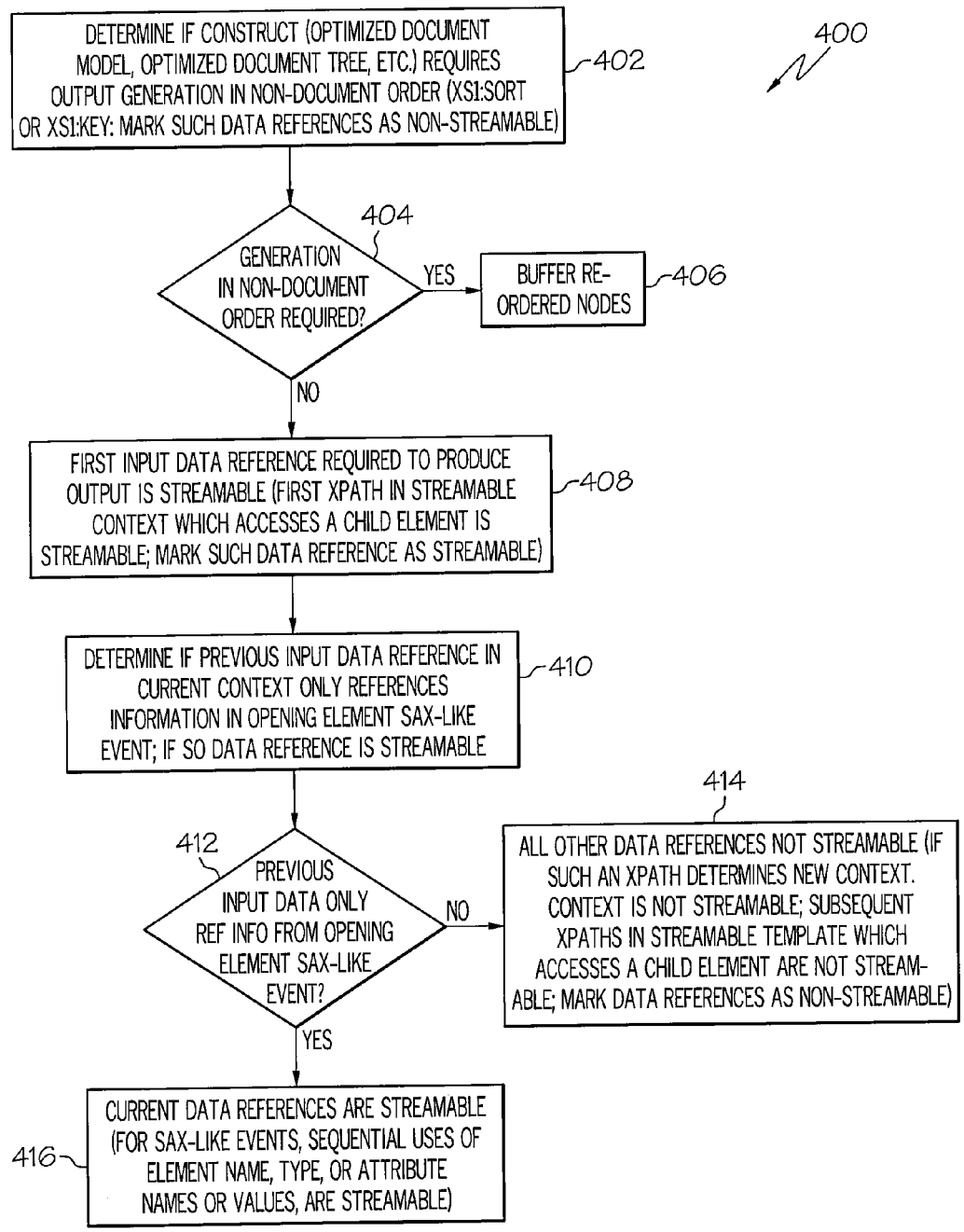
FIG. 4 is an example of a method for determining streamability of a current context based on the data reference that defines the context in accordance with an embodiment of the present invention.

FIG. 4 is an example of a method 400 for determining streamability of a current context based on the data references that define the context in accordance with an embodiment of the present invention. The method 400 may be used to determine the streamability of the current context in block 308 of the method 300 of FIG. 3.

In block 402, a determination may be made if a construct, e.g., optimized document model, optimized document tree or the like, may require output generation in a "non-document order", meaning that the order in which the information is required in the output is different from that in the input document. For example, the XSLT operations xsl:sort or xsl:key may require output generation in a non-document order. Such data references may be marked or otherwise identified as non-streamable.

In block 404, a decision is made if the output generation may be required in non-document order from the analysis in block 402. If so, the method 400 may advance to block 406 where it records that the re-ordered nodes will have to be buffered. If output generation is in document order, the method 400 may advance to block 408. In block 408, the method has determined that the first input data reference required to produce an output is streamable. For example, in a streamable context the first XPath which accesses a child element is streamable. This data reference may be marked as streamable.

In block 410, a determination may be made if the previous input data reference in the current context only references information in an opening element SAX-like event. If so, the data reference is streamable. SAX herein refers to the Simple Application Programming Interface (API) for XML, which presents the input document's contents via a sequence calls from the parser ("events") representing parsing units of the document (as opposed to the W3C's Document Object Model and other in-memory models which present the document as a random-access navigable data structure). Thus, "SAX-like event" herein refers to parsing-unit event of this kind, whether from an implementation of the SAX API or from other sources.

In block 412, a decision may be made if the previous input data only references information from the opening element SAX-like event in block 410. If not, the method 400 may advance to block 414. In block 414, all other data references are not streamable. If such an XPath determines a new context (for example, as the select in an "xsl:for-each" expression), the context is not streamable. As another example, subsequent XPaths in a streamable template which access a child element are not streamable. Such data and contexts may be marked or otherwise identified as non-streamable. If a context is marked as non-streamable, then anything built off the context also is non-streamable.

If a determination is made in block 412 that the previous input data only references information from an opening element SAX-like event in block 410, the method 400 may advance to block 416. In block 416, the method 400 has concluded that the data references in the current context are streamable for SAX-like events. For example, sequential uses of element names, types, or attribute names or values, or similar data references which reference the same node are streamable. In other words, if a node's name can be read in a streaming fashion, and the node's data is accessed again before reading another node's data, the node is still streamable. But if different elements' data are being accessed, then the node probably will not be streamable. As another example, if a file is being copied line-by-line, the file can be streamed since each line can be held in memory for substantially very little time. Similarly, if each line is being written twice, one after the other, the file can still be streamed. However, if the entire file is being copied twice, back-to-back, then the entire file needs to be retained in memory so it is available for the second copying pass.

Figure 5:
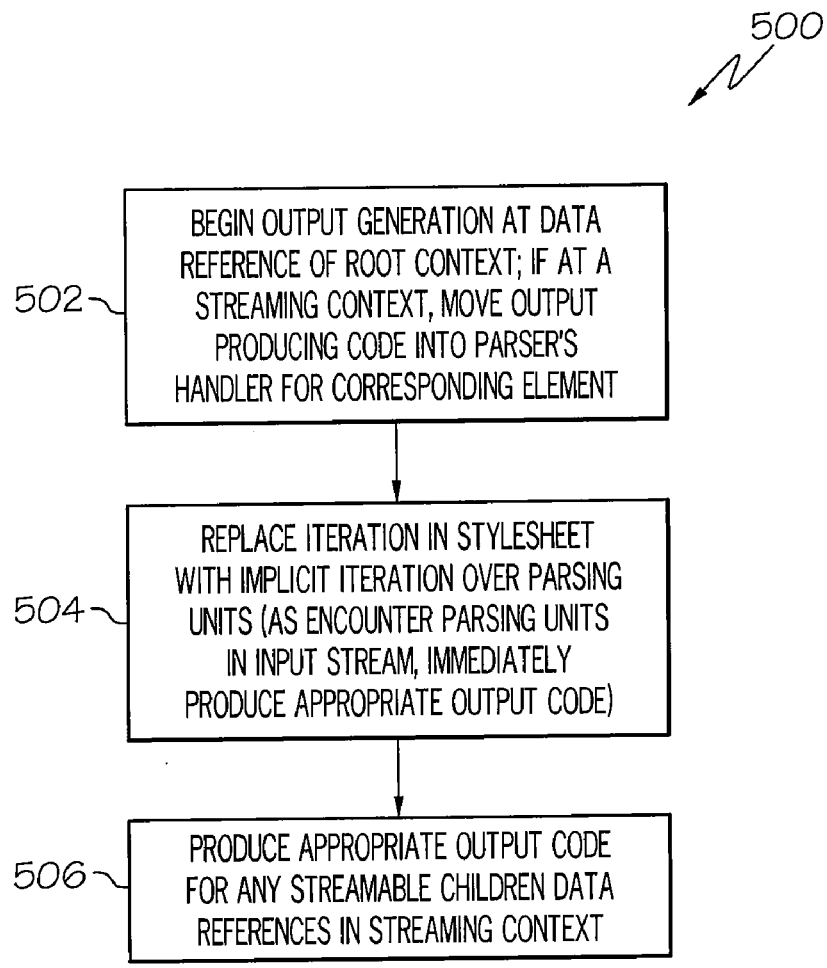
FIG. 5 is a flow chart of an example of a method for stream-optimizing any streamable contexts to generate an output document in accordance with an embodiment of the present invention.

FIG. 5 is a flow chart of an example of a method 500 for stream-optimizing any streamable contexts to generate an output document in accordance with an embodiment of the present invention. The method 500 may be used for performing the operation in block 312 of FIG. 3.

In block 502, the output generation may begin at the data reference of the root context. If the current context has been marked or designated as a streamable context, the context or output producing code may be moved into the parser's handler for a corresponding element, eliminating the need to instantiate an in-memory model for that context's defining data references.

In block 504, the method replaces explicit iteration in the stylesheet or template with the implicit iteration over the parsing units which occurs as they are parsed from the input stream. For example, the stylesheet might iterate over a set of elements with an "xsl:for-each" statement. In a streaming model, this explicit iteration is performed implicitly by evaluating the for-each body as each element is encountered in the input stream. This means as elements are encountered in the input stream, appropriate code can be produced that yields the intended output without requiring any in-process memory after the output has been generated.

In block 506, if the streaming context has any references to streamable children, the code which produces their output can be moved into the parser's handler as well (by recursive application of this streaming optimization), to produce the appropriate output code or optimized program code or data to produce the output document. Initially, a program is used where a data model is built-up. The data model may then be processed to produce the output. The output production which is safe is moved into the model construction first. The first movement step always succeeds because the outermost data-model generation returns the entire document model. So all necessary data is, by definition, present. The next smaller independent subtree is then moved deeper into the model construction. This motion or action is repeated, moving smaller and smaller subtrees deeper and deeper into the model construction until everything has been moved into the model construction or everything else needs to be buffered.

Figure 6:
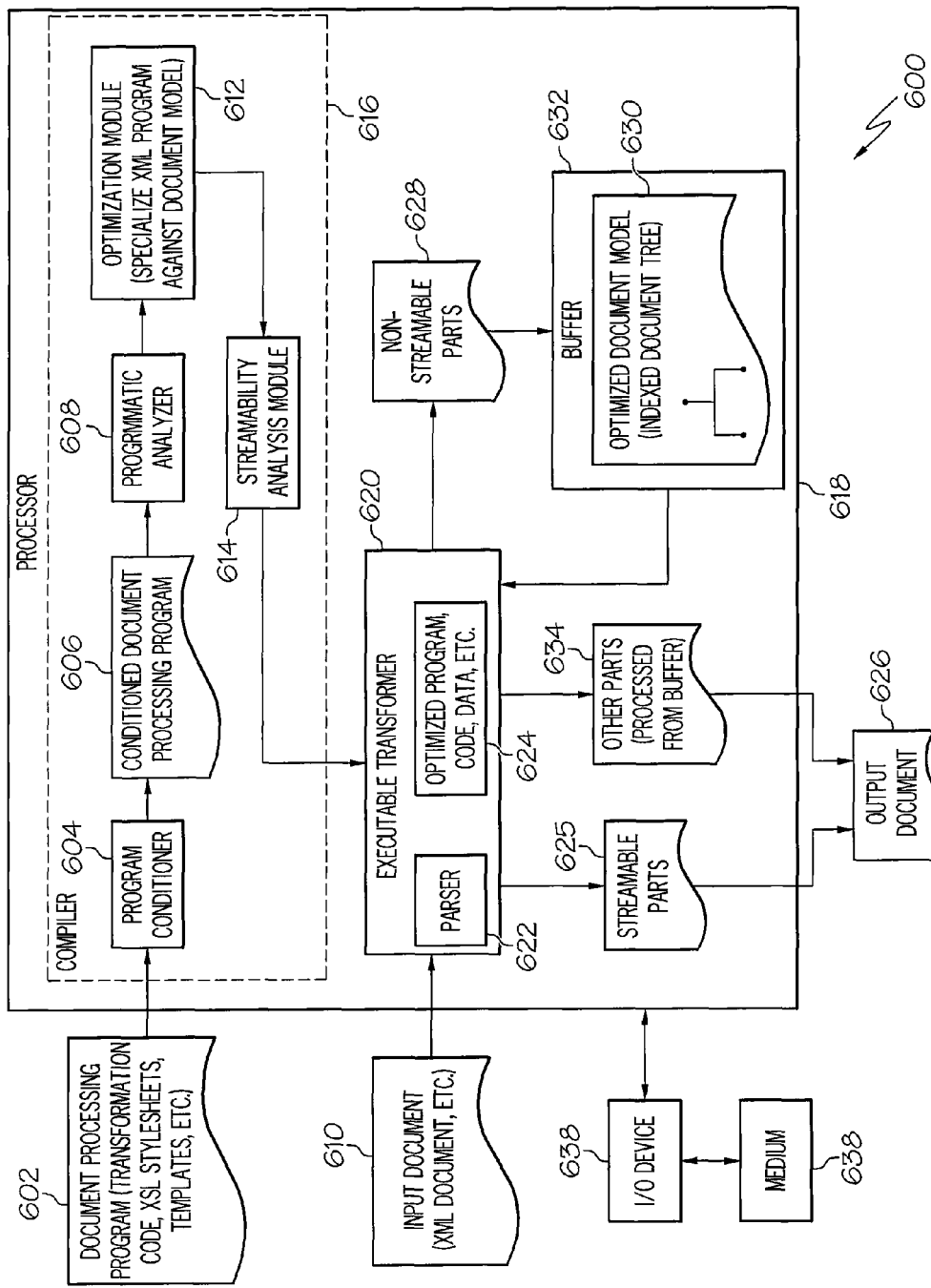
FIG. 6 is a block diagram of an example of a system for processing an electronic document using streaming optimization via programmatic analysis of XML use in accordance with an embodiment of the present invention.

FIG. 6 is a block diagram of an example of a system 600 for processing an electronic document using streaming optimization via programmatic analysis of XML use in accordance with another embodiment of the present invention. The methods 100, 112, 300, 400 and 500 may be embodied in and/or performed by the system 600. A document processing program 602 or XML program, such as an XSL stylesheet or similar program may be received via a network or via some other means by a program conditioner 604. The program conditioner 604 may produce a conditioned program 606. The program conditioner 604 may perform operations similar to those described with respect to the block 102 of the method 100 of FIG. 1A.

A programmatic analyzer 608 may receive the conditioned program 606. The programmatic analyzer 608 may determine all required or used portions of an input document 610 based on the conditioned document processing program 606. The programmatic analyzer 608 may perform operations similar to those described with respect to block 104 in FIG. 1.

An optimization module 612 or input specialization transform module may be associated with the programmatic analyzer 608 and may optimize the conditioned document processing program 606 to generate an optimized document processing program. The optimization module 612 may perform similar operations to those described with respect to block or module 106 in FIG. 1A.

A streamability analysis module 614 may be provided to determine which nodes and contexts of the input document may be streamable. Any non-streamable nodes or contexts or parts of the input document may be buffered as described herein. The streamability analysis module 614 may perform operations similar to those described with respect to block 108 of FIG. 1A and the methods 300 and 400 of FIGS. 3 and 4, respectively.

The document conditioner 604, the programmatic analyzer 608, optimization module 612 and streamability module 614 may form part of a compiler 616 on a processor 618.

An executable transformer 620 may result from the streamability analysis module 614. The executable transformer 620 may include a parser 622 and optimized program code 624 stored and operable on the processor 618 to process the input document 610 during run time. The input document 610 may be transformed by the executable transformer 620 to form or produce an output document 626 as described in more detail herein. The executable transformer 620 may perform or embody the method 112 of FIG. 1B. Any part of the input document 610 which is streamable may be transformed by the executable transformer 620 and the transformed streamable part 625 may be written into the output stream to produce a corresponding piece of the output document 626. Parts of the input data model that will never be referenced again by the executable transform as determined by the streamability analysis may be erased from memory after being transformed.

Any non-streamable parts 628 of the input document 610 may be used to build up an optimized document model 630 as specified by the whole-program data usage analysis in block 104 of FIG. 1A. The document model 630 may be buffered on a buffer 632 as it is being built-up. The stored built-up optimized document model 630 may then be processed by the executable transformer 620 similar to that described with respect to block 140 in FIG. 1B. The other parts 634 processed by the executable transformer 620 from the optimized document model 630 may complete the output document 626. The output document 626 may be stored or encoded on a computer writable medium, such as medium 638.

Input devices, other output devices or combination input/output devices 636 may be associated with the processor 618 to permit a user to control, update and maintain the processor 618 and associated components. For example, a computer program product embodied in a tangible medium 638, similar to that previously described, may be used to transfer computer useable program code to the processor 618. The computer useable program code may embody the methods 100, 112, 300, 400 and 500. The medium 638 may also embody updates for the document conditioner 604, program analyzer 612, streamability module 614, and optimization module 612.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for processing an electronic document, comprising:
    performing, by a processor, a programmatic analysis to determine all required portions of an input document to produce an output document;
    generating, by the processor, an executable transformer to produce the output document from the input document; and
    producing, by the processor, the output document by transforming any streamable parts of the input document directly to corresponding parts of the output document without extraneous intermediate buffering.

2. The method of claim 1, wherein generating the executable transformer comprises:
    generating a parser to parse the input document; and generating an optimized program code to transform the input document to produce the output document.

3. The method of claim 1, further comprising:
    building-up an optimized document model from any non-streamable parts of the input document; and
    processing the built-up optimized document model in the executable transformer to complete the output document.

4. The method of claim 1, wherein performing the programmatic analysis comprises performing a whole-program data usage analysis.

5. The method of claim 1, wherein performing the programmatic analysis comprises:
    analyzing accesses by a stylesheet to the input document to generate the executable transformer; and
    rewriting expressions of the stylesheet that address any required portions of the input document.

6. The method of claim 1, further comprising determining which nodes and contexts of the input document are streamable.

7. The method of claim 6, further comprising determining that the node is streamable if the node can produce an output to which the node contributes as the node's input data is parsed.

8. The method of claim 6, wherein determining which nodes and contexts of an input document are streamable comprises determining which portions of the optimized output program rely upon references of the input document that are entirely local to a particular subtree of the input document.

9. The method of claim 6, wherein determining which nodes and contexts of an input document are streamable comprises:
    initializing all data references as being streamable;
    matching a root path of the input document into a template; setting the root path of the input document as a current context; determining if the current context is streamable based on a data reference defining the current context;
    streaming the current context during parsing of the input document in response to the current context being streamable; and buffering the current context in response to the current context being non-streamable.

10. The method of claim 9, wherein determining if the current context is streamability comprises:
    determining if an output construct requires output generation in a non-document order;
    marking a data reference as non-streamable in response to the output construct requiring output generation in a non-document order and buffering a re-ordered form of the input document;
    marking a first input data reference required to produce the output construct as streamable in response to the output construct not requiring generation in a non-document order; and
    determining if previous input data reference in the current context only references information in an opening element SAX-like event, wherein the current data reference is streamable in response to the previous input data referencing information in the opening element SAX-like event.

11. The method of claim 1, further comprising erasing from a memory any parts of the input document which will never again be referenced by the executable transform as determined from a streamability analysis.

12. A system for processing a document, comprising:
    a programmatic analyzer operable on a processor to determine all required portions of an input document to produce an output document;
    a streamability analysis module to determine which nodes and contexts of an input document are streamable to produce the output document; and
    a buffer to build-up an optimized document model from any non-streamable parts of the input document.

13. The system of claim 12, further comprising an executable transformer generable to produce the output document transformed from the input document.

14. The system of claim 13, wherein the executable transformer comprises:
    a parser to parse the input document;
    an optimized program code to transform the input document to produce the output document.

15. The system of claim 12, wherein the streamability analysis module comprises:

means for initializing all data references as being streamable; means for matching a root path of the input document into a template;

means for setting the root path of the input document as a current context;

means for determining if the current context is streamable by determining a streamability of data references inside the current context;

means for streaming the current context during parsing of the input document in response to the current context being streamable; and a buffer to buffer the current context in response to the current context being non-streamable.

16. A computer program product to process an electronic document, the computer program product comprising:

a computer usable storage medium having computer usable program code embodied therein, the computer usable storage medium comprising:

computer usable program code configured to perform a programmatic analysis to determine all required portions of an input document to produce an output document;

computer usable program code configured to generate an executable transformer to produce the output document from the input document; and computer usable program code configured to produce the output document by transforming any streamable parts of the input document directly to corresponding parts of the output document without extraneous intermediate buffering.

17. The computer program product of claim 16, wherein the computer usable medium further comprises:

computer usable program code configured to generate a parser to parse the input document; and computer usable program code configured to generate an optimized program code to transform the input document to produce the output document.

18. The computer program product of claim 16, wherein the computer usable medium further comprises computer usable program code configured to buffer any non-streamable nodes and contexts of the input document.

19. The computer program product of claim 16, wherein the computer usable medium further comprises:

computer usable program code configured to build-up an optimized document model from any non-streamable parts of the input document; and computer usable program code configured to process the built-up optimized document model in the executable transformer to complete the output document.

20. The computer program product of claim 16, wherein the computer usable medium further comprises:

computer usable program code configured to initialize all data references as being streamable;

computer usable program code configured to match a root path of the input document into a template;

computer usable program code configured to set the root path of the input document as a current context;

computer usable program code configured to determine if the current context is streamable by determining streamability of data references inside the current context;

computer usable program code configured to stream the current context during parsing of the input document in response to the current context being streamable; and computer usable program code configured to buffer the current context in response to the current context being non-streamable.

\* \* \* \* \*